United States Patent
Suzuki et al.

(10) Patent No.: US 7,204,784 B2
(45) Date of Patent: Apr. 17, 2007

(54) APPARATUS FOR CONTROLLING A GEAR RATIO CHANGING OPERATION IN A TRANSMISSION

(75) Inventors: Yoshihide Suzuki, Toyoake (JP); Takahiro Misu, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 172 days.

(21) Appl. No.: 11/019,725

(22) Filed: Dec. 23, 2004

(65) Prior Publication Data
US 2005/0143217 A1    Jun. 30, 2005

(30) Foreign Application Priority Data
Dec. 25, 2003   (JP)   ............................. 2003-429589

(51) Int. Cl.
F16H 3/12   (2006.01)

(52) U.S. Cl. .................. 477/20; 477/108; 477/124

(58) Field of Classification Search .................. 477/20, 477/124, 108
See application file for complete search history.

(56) References Cited

U.S. PATENT DOCUMENTS

| | | | | |
|---|---|---|---|---|
| 3,956,947 | A * | 5/1976 | Leising et al. | 477/120 |
| 4,485,695 | A * | 12/1984 | Kawamoto | 477/130 |
| 6,377,883 | B1 * | 4/2002 | Shimabukuro et al. | 701/51 |
| 6,685,591 | B2 * | 2/2004 | Hanyu et al. | 475/5 |

2002/0055411 A1   5/2002   Yoshiaki et al.

FOREIGN PATENT DOCUMENTS

| EP | 1 122 109 A2 | 8/2001 |
|---|---|---|
| JP | 11-69509 | 3/1999 |
| WO | 98/31559 | 7/1998 |
| WO | WO 9831559 A1 * | 7/1998 |

OTHER PUBLICATIONS

Partial European Search Report dated Aug. 5, 2005.
P.W. Masding, et al., "A microprocessor controlled gearbox for use in electric and hybrid-electric vehicles", School of Engineering and Applied Science, University of Durham, South Road, Durham, England DH1 3LE, Vo. 10, No. 4, pp. 177-186, Jul.-Sep. 1988.

* cited by examiner

Primary Examiner—Richard M. Lorence
Assistant Examiner—Edwin A. Young
(74) Attorney, Agent, or Firm—Buchanan Ingersoll & Rooney PC

(57) ABSTRACT

An apparatus for controlling a gear ratio changing operation in a transmission includes clutch controlling device, a motor generating an assist driving torque, and an assist driving torque controlling device for controlling, in response to a clutch operation, the motor to generate a target assist driving torque. While transmission of driving torque between an internal combustion engine and the transmission is being cut off during a clutch control at a constant stroke speed from an engaged state to a disengaged state for a shift operation in the transmission, the assist driving torque controlling device controls the motor to generate an assist driving torque so that the assist driving torque reaches the target assist driving torque at a constant rise rate per time.

7 Claims, 6 Drawing Sheets

APPARATUS FOR CONTROLLING A GEAR RATIO CHANGING OPERATION IN A TRANSMISSION

CROSS REFERENCE TO RELATED APPLICATIONS

This application is based on and claims priority under 35 U.S.C. § 119 with respect to Japanese Patent Application 2003-429589, filed on Dec. 25, 2003, the entire content of which is incorporated herein by reference.

FIELD OF THE INVENTION

This invention generally relates to an apparatus for controlling a shift operation in an automated manual transmission for a vehicle, on which a motor generator is mounted, as well as an internal combustion engine. The motor generator generates, by use of electric power stored in a battery, a driving force and then regenerates electric power by use of energy from the vehicle. This shift operation control apparatus includes a clutch assembly, which is automated, and an automated manual transmission, in which a shift operation is automated.

BACKGROUND

Conventionally, an apparatus for controlling a shift operation in a transmission has been widely known, and includes a multi-stage synchromesh-type transmission, in which a shift operation can be performed by means of a control signal, and a clutch device, in which a clutch of a clutch assembly can mechanically establish and interrupt transmission of a driving force between a driving power source and the transmission itself in response to a control signal. This type of apparatus is referred to as an automated manual transmission (AMT). By virtue of this automated manual transmission, a gear ratio changing operation including a shift operation performed automatically in the transmission as well as automatically performed engagement and disengagement of the clutch.

In this type of apparatus for controlling a shift operation in a transmission, when the clutch has been disengaged during a shift operation in the transmission, torque from the engine is not transmitted to the vehicle wheels. In this case, even when a vehicle driver expects or requires acceleration of the vehicle, the achieved degree of acceleration may be virtually zero, and on occasions an impression of a loss in vehicle acceleration can even be created. Moreover, when the clutch is engaged during a final phase of the gear ratio changing operation, a difference between an engine rotational speed (i.e., rotational speed of a crankshaft) and a transmission input shaft rotational speed can occur due to factors such as an excessive rotational speed of the engine, thereby on occasions resulting in an excessive degree of shift shock.

In light of the foregoing, JP11 (1999)-69509A discloses a shift operation control apparatus for a hybrid-electric vehicle (HEV), on which an internal combustion engine and an electric motor are mounted as the driving power source. The HEV further includes a multi-stage synchromesh-type transmission, in which a shift operation is automated, and a clutch device for automatically engaging and disengaging a clutch of a clutch assembly. In this shift operation control apparatus, a loss of vehicle acceleration, i.e., the occurrence of vehicle deceleration, can be avoided by increasing a driving torque generated by an electric motor which is activated auxiliary while the clutch is in a state of disengagement. The driving torque generated by the electric motor can be calculated on the basis of the depressing amount of an accelerator pedal, a variation of the depressing amount of the accelerator pedal and a driving torque from the engine after a shift operation. The driving torque from the engine after the shift operation can be expected on the basis of an engine rotational speed prior to the shift operation. The driving torque is thus generated by the electric motor on the basis of the engine driving torque after the shift operation, thereby making possible the gear ratio changing operation and an acceleration of the vehicle appropriate to an accelerator pedal operation performed by a vehicle driver.

However, in the shift operation control apparatus described above, the driving torque generated by the electric motor at the time of a shift operation is generated, or intensified on the basis of a meet point of a clutch of the clutch assembly, a meet point which can be detected actually, or, alternatively on the basis of a clutch meet point which is predetermined. The meet point can be defined as a point at which a vehicle starts moving from a vehicle stationary condition while the clutch is gradually engaged without an accelerator pedal operation. Thus, it becomes possible to conceive in this shift operation control apparatus that a degree of shift shock is decreased, (1) by preventing any sudden cutting off of the driving torque from the engine to the transmission by detecting the clutch being partially engaged or by estimating a point where the clutch is partially engaged and (2) by generating an assist driving force by the electric motor.

In this type of shift operation control apparatus, after a period of time in which the clutch has been partially disengaged at the time of a shift operation, the clutch is completely disengaged, a shift operation is performed in the transmission, and the clutch is again engaged. To a driver who requires that a vehicle accelerates, such gear ratio changing operation including a shift operation in the transmission as well as a clutch engagement/disengagement operation appears to take longer than the actual period of time required for the gear ratio changing operation, thereby resulting in a feeling of a loss of vehicle acceleration.

The present invention has been made in view of the above circumstances, and provides an apparatus for controlling a shift operation in a transmission, an apparatus which effectively reduces the degree of shift shock at the time of a gear ratio changing operation and also quickly achieves the gear ratio changing operation.

SUMMARY OF THE INVENTION

According to an aspect of the present invention, an apparatus for controlling a gear ratio changing operation in a transmission includes an internal combustion engine, a multi-stage synchromesh-type transmission capable of shifting in accordance with a vehicle driving condition, a clutch positioned between the internal combustion engine and the transmission and capable of transmitting and interrupting a driving torque between the internal combustion engine and the transmission, clutch controlling means for controlling the clutch, a motor positioned at an output shaft of the transmission and configured to generate an assist driving torque, target assist driving torque calculating means for calculating a target assist driving torque generated by the motor, and assist driving torque controlling means for controlling, in response to transmission and interruption by the clutch of the driving torque between the internal combustion engine and the transmission, the motor to generate the target assist driving torque. When, in response to a disengagement of the clutch at the time of a shift operation in the transmission, the driving torque between the internal combustion engine and the transmission is cut off, the assist driving torque controlling means controls the motor so as to generate an assist driving torque which rises directly and reaches a level of the target assist driving torque in a single step.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described in detail hereinbelow with reference to the accompanying drawings.

Figure 1:
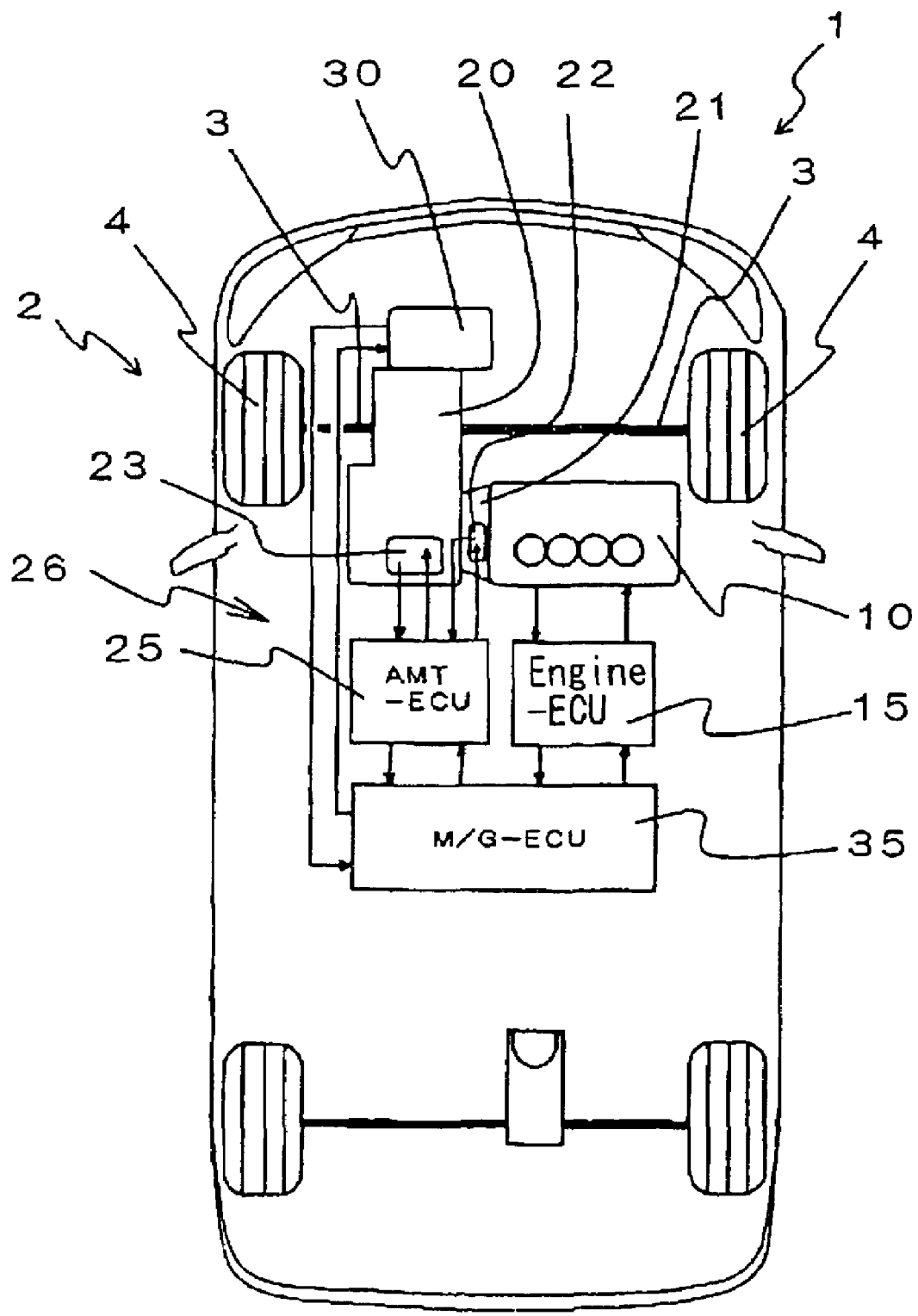
FIG. 1 is a system chart for illustrating an entire structure of an apparatus for controlling a shift operation in a transmission according to an embodiment of the present invention.
Figure 2:
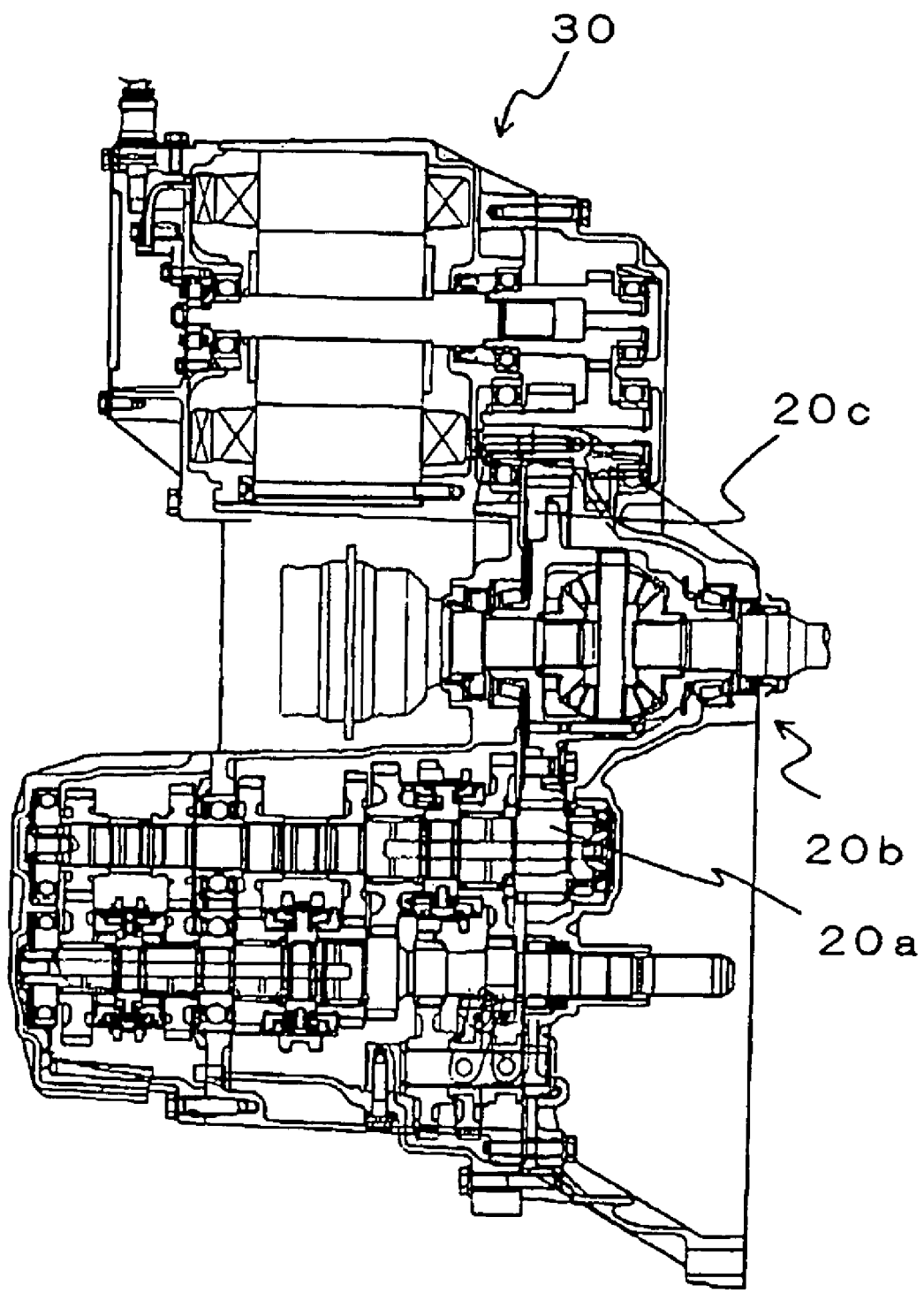
FIG. 2 is a cross sectional view illustrating a principal part of the apparatus according to the embodiment of the present invention.

As illustrated in FIGS. 1 and 2, a vehicle according to an embodiment of the present invention is provided with an engine 10 serving as an internal combustion engine, a gear mesh-type transmission 20 serving as a multi-stage synchro-mesh-type transmission, a clutch 21 positioned between the engine 10 and the transmission 20, a clutch actuator 22 serving as a clutch controlling means, which engages and disengages the clutch 21 by means of a signal transmitted from an AMT-ECU 25, and a motor generator 30 (i.e., motor). The motor generator 30 is gear-meshed with a ring gear 20c of a differential gear 20b, the ring gear 20c capable of being gear-meshed with an output shaft 20a of the transmission 20.

In terms of the engine 10, factors such as a throttle valve opening degree, an engine combustion, and an engine rotational speed (i.e., rotational speed of a crankshaft) are controlled in response to signals transmitted from an engine-ECU 15, and the driving force outputted from the engine 10 is thus determined. In terms of the transmission 20, a shift actuator 23 serving as a shift stage controlling means is provided, a shift actuator 23 which performs shift operations in the transmission 20 in response to signals transmitted from an AMT-ECU 25. A shift stage in the transmission is automatically selected or changed on the basis of conditions in which the vehicle is being driven. According to the embodiment of the present invention, an automated manual transmission system 26 (AMT system) is configured mainly with the clutch 21, the clutch controlling means (i.e., clutch actuator 22), the transmission 20, the shift stage controlling means (i.e., shift actuator 23) and with the AMT-ECU 25, which transmits signals to the other components of the AMT system. Moreover, a vehicle driving system 2 is configured mainly with the aforementioned conventional AMT system 26 and the motor generator (M/G) 30. According to the embodiment of the present invention, an Interior Permanent Magnet (IPM) motor, which is characterized as being highly responsive, and generating a high driving torque, is applied as the motor generator 30. The engine-Electronic Control Unit 15 (hereinafter, referred to as an engine-ECU), the AMT-Electronic Control Unit 25 (hereinafter, referred to as an AMT-ECU) and an M/G-Electronic Control Unit 35 (hereinafter, referred to as an M/G-ECU) mutually communicate appropriate control signals in respect of vehicle driving conditions and rates of energy consumption, on the basis of information concerning factors such as an engine rotational speed, a throttle valve opening degree, a vehicle speed, a shift stage in the transmission 20, a depression amount of an accelerator pedal (not shown), an M/G rotational speed and electric power being charged in the battery.

The following is an explanation of the transmission of power appropriate to the driving conditions of the vehicle 1.

At the time when the vehicle 1 starts from a stationary condition, it is necessary to achieve a smooth start. Accordingly, only the motor generator 30 is supplied with electric power from a battery in response to control signals transmitted from the M/G-ECU 35, and the motor generator 30 generates a driving torque. At this point, the engine is not activated. The driving torque is transmitted to the ring gear 20c of the differential gear 20b, and is further transmitted to at least one vehicle tire 4 via an axle 3.

Once the vehicle speed rises up to a predetermined level, the engine 10 is activated and generates the driving torque. The motor generator 30 that has been activated is then stopped, substantially at the same time as the engine starts and begins to generate torque. In other words, once the vehicle speed rises to the predetermined level, the vehicle is shifted from a motor generator-based driving condition to an engine-based driving condition. Moreover, when the vehicle driver operates the accelerator pedal (not shown) to a substantial degree and thus expresses a desire for rapid vehicle acceleration, both the motor generator 30 and the engine 10 generate a driving torque of a degree which is adequate for purposes of achieving the level of acceleration desired.

On the other hand, when the vehicle 1 is in a state of deceleration, a rotation of at least tire 4 is converted into a rotation of a shaft of the motor generator 30. In this way, the energy of the vehicle 1 is converted into an electrical power that can be stored in the battery (not shown), until such time as the energy is required by the motor generator 30.

Figure 3:
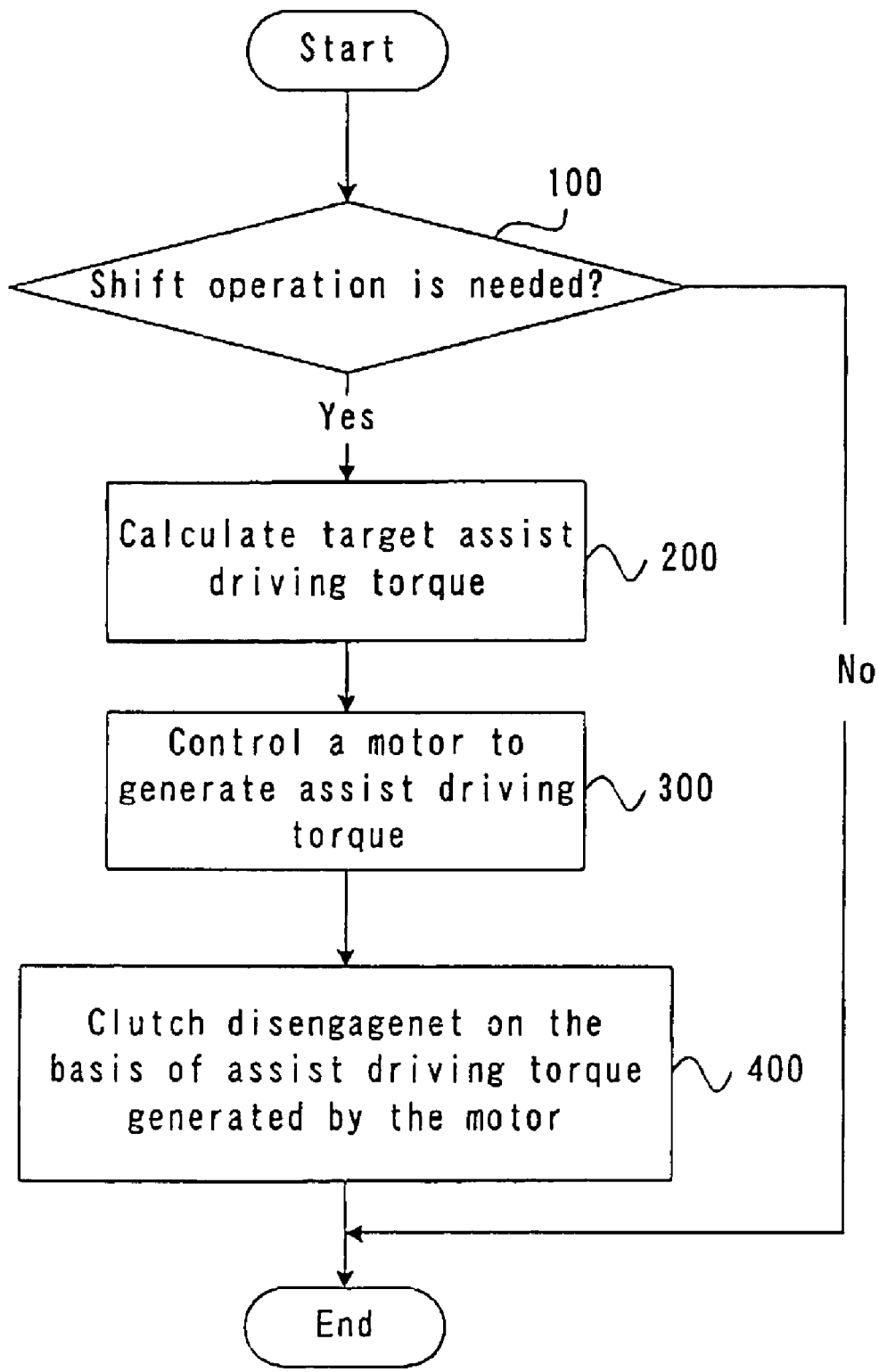
FIG. 3 is a flowchart for disengaging a clutch assembly upon a shift operation, according to the embodiment of the present invention.

The following explains a shift-up operation in the apparatus for controlling a shift operation in a transmission for a vehicle 1 according to the embodiment of the present invention, with reference to a flowchart illustrated in FIG. 3. The flowchart explains a process of a shifting program from an initial shift operation to a clutch disengaging operation.

At step 100, the AMT-ECU 25 judges, whether at the time a shifting operation needs to be performed in the transmission 20, pursuant to a shift-stage scheduling map which has been predetermined. When a negative answer "No" is obtained at step 100, i.e., when a currently selected shift stage corresponds to a shift stage determined on the shift-stage scheduling map, the shifting program is terminated. When an affirmative answer "Yes" is obtained at step 100, i.e., when the currently selected shift stage does not correspond to the shift stage determined on the shift-stage scheduling map, the program proceeds to step 200.

At step 200, the M/G-ECU 35, serving as a target assist driving torque calculating means 35, calculates and determines a level of a target assist driving torque which needs to be generated by the motor generator 30 for purposes of avoiding shift shock at the time of the shift operation, i.e., for the purpose of maintaining a current level of vehicle speed. More specifically, at step 200, the level of the target assist driving torque is calculated by the M/G-ECU 35 by calculating a current level of driving torque transmitted from the engine 10, on the basis of factors such as the degree of acceleration opening of the accelerator pedal, a throttle valve opening degree, an engine rotational speed and a vehicle speed. The program then proceeds to step 300.

At step 300, the M/G-ECU 35, serving as the target assist driving torque calculating means, drives the motor generator 30 so as to generate the level of target assist driving torque required. More specifically, in order to make it possible for an assist driving torque actually generated by the motor generator 30 to reach a peak torque value of the target assist driving torque from a zero, a value of electric current applied to a coil of the motor generator 30 is controlled on the basis of a duty cycle, and an appropriate sine wave or rectangular wave is selected as a waveform for controlling electric current to be applied to the coil. The program then proceeds to step 400.

At step 400, in response to the driving torque generated by the motor generator 30, the AMT-ECU 25 transmits a signal to the clutch actuator 22 and, rapidly, completely disengages the clutch assembly 21.

Figure 4:
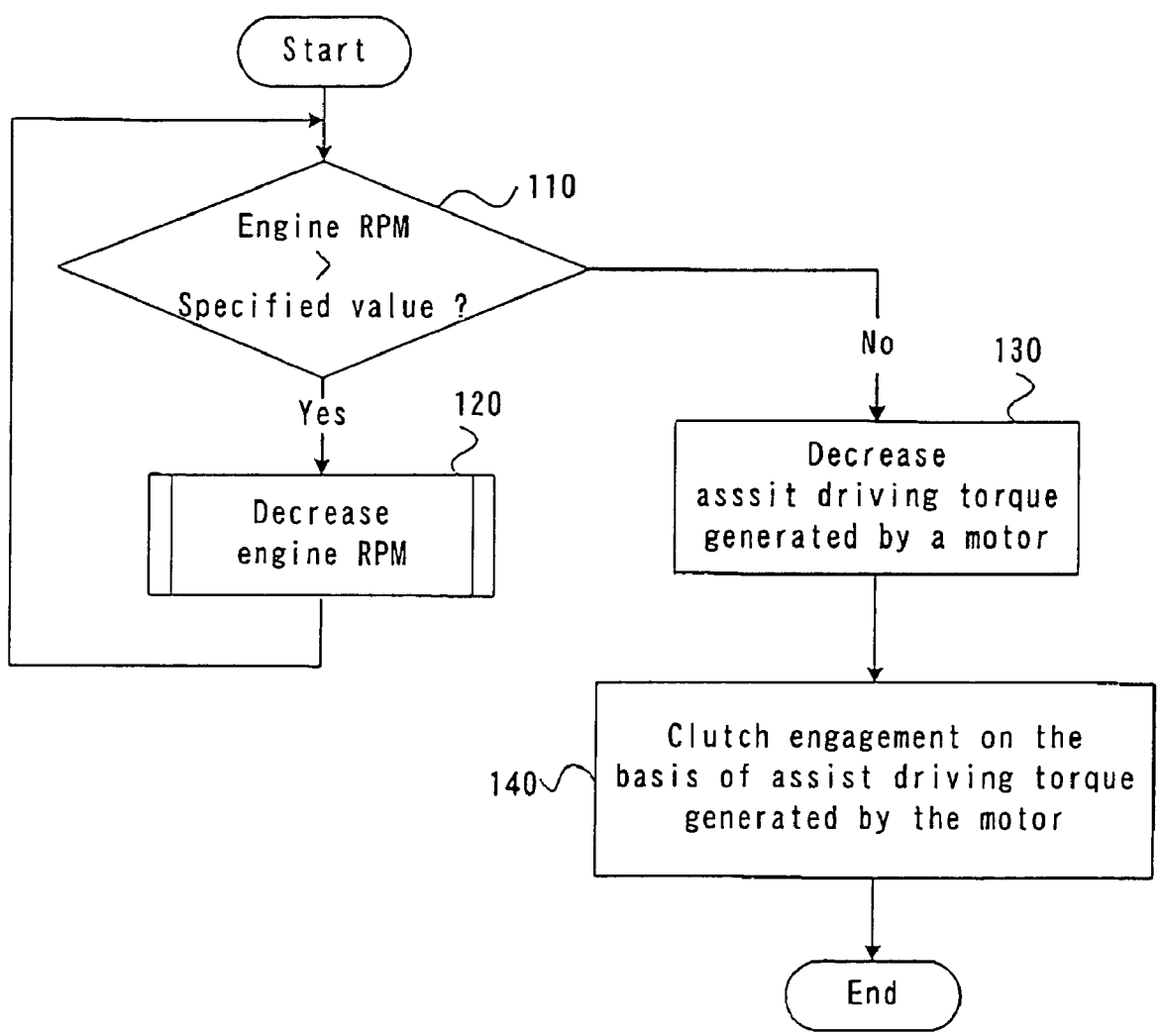
FIG. 4 is another flowchart for engaging the clutch assembly upon a shift operation according to the embodiment of the present invention.

A flowchart illustrated in FIG. 4 illustrates a process of the shifting program from a state in which the clutch has been disengaged to a state where the clutch is fully engaged.

After, on the basis of a shift operation signal from the AMT-ECU 25, the shift actuator 23 has performed an shift-up operation to a higher shift stage in the transmission 20, the shifting program proceeds to step 110. At step 110, the AMT-ECU 25 judges whether or not a current rotational speed of the engine 10 (i.e., a current rotational speed of a crankshaft of the engine 10) is higher than a specified value. For example, when a shift-up operation to a higher shift stage is performed under constant vehicle speed conditions, a rotational speed of an input shaft of the transmission 20 needs to be slower, in response to a change of a gear ratio in the transmission 20, than that thereof prior to the shift-up operation. Further, the engine rotational speed is required to become smaller corresponding to the decrease of the transmission input shaft rotational speed. Unless each rotational speed does not become smaller than that thereof prior to the shift-up operation, the clutch assembly 20 may become engaged while the difference between the engine rotational speed and the transmission input shaft rotational speed remains large. In this case, the rotation of the engine 10, i.e., the rotation of the crankshaft of the engine 10, may act as a resistance load, and an excessive degree of shift shock may occur.

As described above, at step 110, the AMT-ECU 25 judges whether a current engine rotational speed is greater than the specified value which is determined on the basis of an engine rotational speed after the shift-up operation. When a negative answer "No" is obtained, i.e., when the current engine rotational speed is not greater than the specified value, the program proceeds to step 130. On the other hand, when an affirmative answer "Yes" is obtained, i.e., when the current engine rotational speed is greater than the specified value, the program proceeds to step 120.

At step 120, the engine-ECU 15 controls the throttle valve (not shown) to be closed and decrease the engine rotational speed. The program returns to step 110 for the purpose of recognizing a current engine rotational speed for a next cycle. A loop between steps 110 and 120 is repeated until the negative answer "No" is obtained at step 110.

At step 130, the M/G-ECU 35 gradually decreases an amount of the assist driving torque generated by the motor generator 30. At step 140, the AMT-ECU 25 controls the clutch actuator 22 for fully engaging the clutch assembly 21.

Figure 5A:
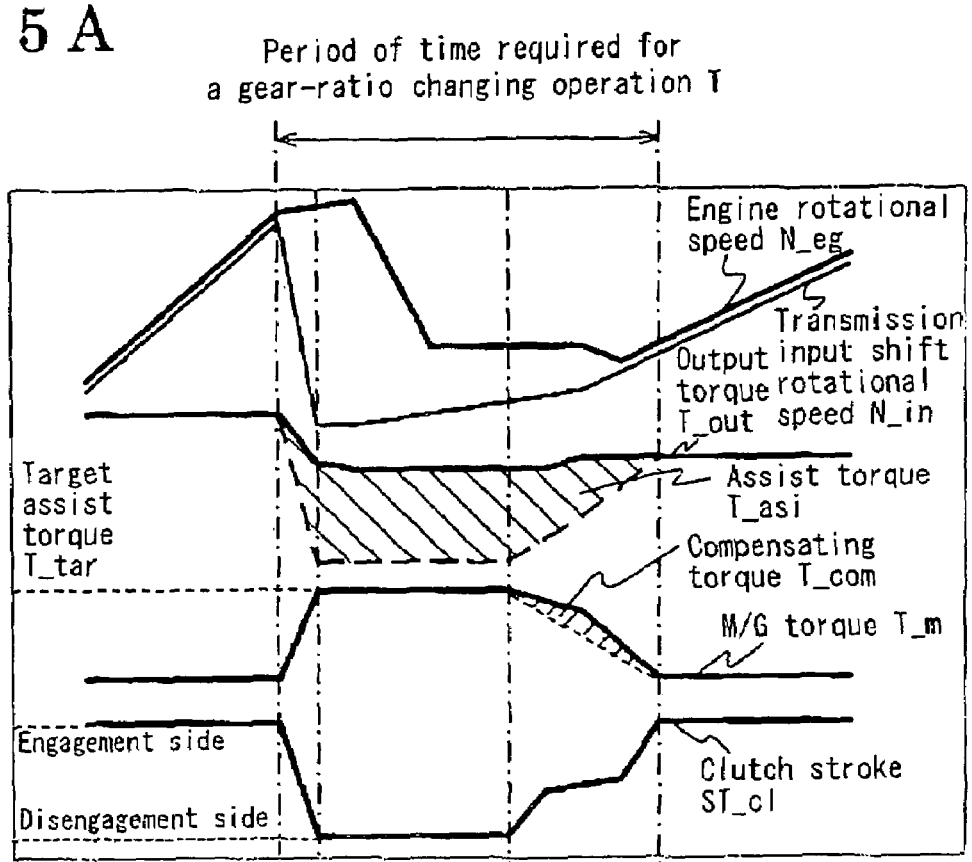
FIG. 5A is a time chart for explaining a gear ratio changing operation according to the embodiment of the present invention.
Figure 5B:
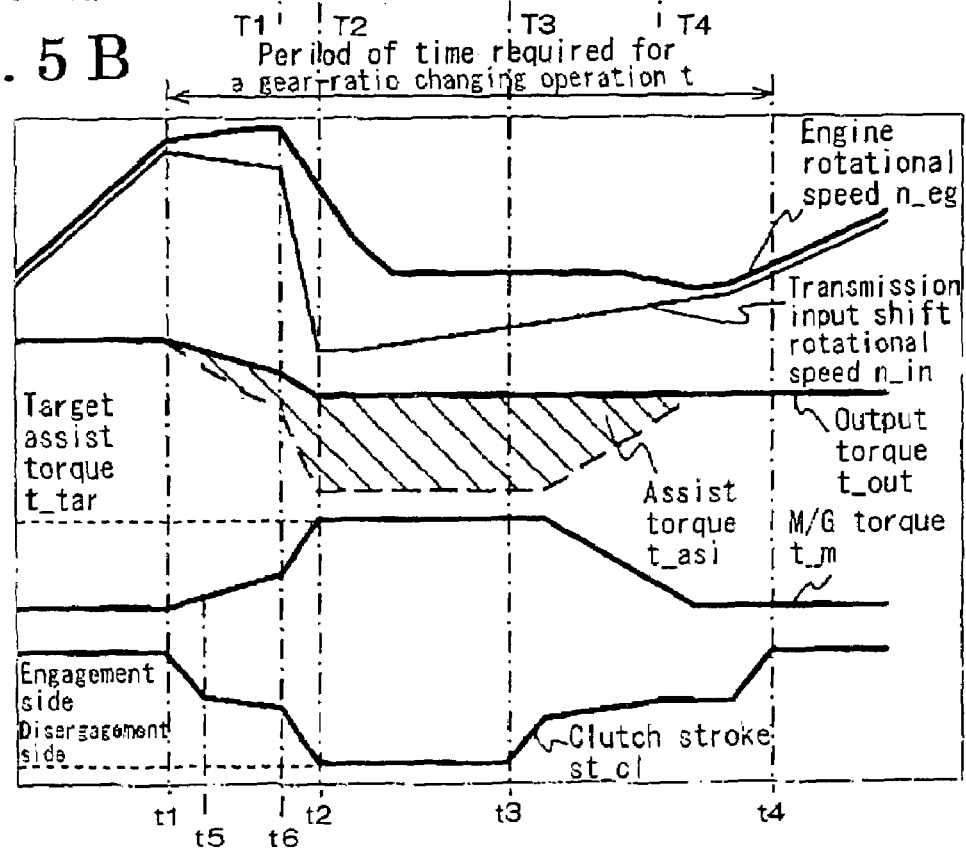
FIG. 5B is a time chart for explaining a gear ratio changing operation as a comparative example relative to the embodiment of the present invention.

The following explains the shifting program for shifting up to a higher shift stage in the transmission 20 with reference to FIGS. 5A and 5B.

First of all, a conventional gear ratio changing operation is described as follows, which can reduce shift shock by partially engaging a clutch. FIG. 5B is a time chart for explaining a gear ratio changing operation from a first shift stage to a second shift state. More particularly, FIG. 5B is a time chart for explaining a gear ratio changing operation from a first shift stage to a second shift stage when the accelerator pedal has been depressed at a constant depressing amount in response to a driver's desire for acceleration of the vehicle 1. The horizontal axis of the time chart in FIG. 5B represents a time for the shift-up operation. Each line from the top in the time chart represents an engine rotational speed n_eg, a transmission input shaft rotational speed n_in, an output torque t_out from the differential gear 20b to the axle 3, an M/G torque t_m generated by the motor generator 30 in response to the signals from the M/G-ECU 35 and a clutch stroke st_cl corresponding to a stroke of the clutch actuator 22. The gear ratio changing operation is initiated at a time t1 and is completed at a time t4.

In FIG. 5B, through the gear ratio changing operation from the time t1 to the time t4, a disengagement operation of the clutch 21 is performed by the clutch actuator 22 from the time t1 to the time t2, the clutch 21 has been completely disengaged from the time t2 to the time t3, and an engagement operation of the clutch 21 is performed by the clutch actuator 22 from the time t3 to the time t4. Moreover, from the time t2 to the time t3, the shift operation is performed in the transmission 20 by the shift actuator 23. The motor generator 30 starts to generate an assist torque t_asi at the time t1 at which the gear ratio changing operation is initiated and the clutch 21 starts moving to a disengagement side. The assist driving torque generated by the motor generator 30 is maintained at a peak value from the time t2 to the time t3, i.e., while the shift operation has been performed in the transmission 20. The motor generator 30 terminates generating the assist driving torque between the time t3 and the time t4, i.e., while the clutch engagement operation is performed.

As described above, during the gear ratio changing operation from the time t1 to the time t4, the assist driving torque generated by the motor generator 30 is transmitted to the axle 3 via the ring gear 20c of the differential gear 20b. Therefore, as illustrated in FIG. 5B, the output torque t_out to the axle 3 is maintained approximately constantly at a value determined on the basis of a gear ratio selected by the shift operation in the transmission 20.

As described above, in the apparatus for controlling a shift operation in a transmission according to the embodiment of the present invention, the M/G torque t_m generated by the motor generator 30 is controlled so as to prevent torque cutoff from the engine 10 to the transmission 20 during the clutch disengagement. The following explains controls of the clutch stroke st_cl and of the motor generator 30 during a clutch engaging operation in this type of apparatus.

In terms of the clutch 21, the clutch actuator 21 pushes a pressure plate (not shown) relative to a clutch disc (not shown) and frictionally engages the pressure plate with the clutch disc, wherein the driving torque from the engine 10 can be transmitted to the transmission 20 via the frictional engagement in the clutch 21. On the other hand, the clutch actuator 21 pushes away the pressure plate from the clutch disc and disengages the pressure plate from the clutch disc, wherein the driving torque from the engine 10 is interrupted from being transmitted to the transmission 20 via the disengagement in the clutch 21.

From the time t1 to the time t2, the clutch actuator 22 is activated for the purpose of disengaging the clutch 21. Moreover, from the time t1 to a time t5, the clutch actuator 22 is activated for the purpose of disengaging the clutch 21 quickly. From the time t5 to a time t6, the clutch 21 has been at a state of a partial engagement. In this case, the transmission input shaft rotational speed n_in and the output torque t_out are both decreased, and acceleration of the vehicle 1 is then lowered. On the other hand, if the clutch 21 is disengaged suddenly from the engagement condition, the driving torque transmitted to the transmission 20 from the engine 10 via the clutch 21 may become virtually zero, and acceleration of the vehicle 1 may also become virtually zero independently of a driver's desire for vehicle acceleration. In light of the foregoing, as illustrated in FIG. 5B, the clutch 21 is brought to the partial engagement condition not to a full disengagement condition. Therefore, the vehicle acceleration can be gradually decreased.

However, in terms of an aging variation of the clutch disc and a wear-out thereof, it may be difficult to control an amount of the driving torque transmitted from the engine 10 to the transmission 20 under the clutch partial engagement condition (from the time t5 to the time t6). Accordingly, the motor generator 30 starts generating the driving torque at the time t1 in sync with a disengagement operation of the clutch 21. This driving torque corresponds to the assist driving torque t_asi which can gradually decrease the output torque t_out. The decrease of the output torque t_out occurs in response to the decrease of the driving torque transmitted to the transmission 20 during the clutch disengagement. As described above, the output torque t_out and the transmission input shaft rotational speed n_in are both gradually decreased by virtue of the clutch partial engagement (from the time t5 to the time t6) and the assist driving torque t_asi generated by the motor generator 30, thereby enabling control of the degree of shift shock to a minimum. At the time t5, deceleration of the vehicle 1 has been sufficiently achieved, and the clutch actuator 22 disengages the clutch 21 quickly. The clutch 21 is then brought to a fully disengaged condition. In order to compensate for a lack of torque due to the clutch full disengagement, the motor generator 30 generates the driving torque in response to the signals transmitted from the M/G-ECU 35.

From the time t2 to the time t3, the clutch 21 has been at a condition of the fully disengagement, while the shift operation is performed in the transmission 20 by the shift actuator 23. From the time t2 to the time t3, the engine 10 has not been applied with load, and the engine rotational speed is increased. Therefore, the engine-ECU 15 controls the throttle valve of the engine 1 to be closed for the purpose of compulsorily decreasing the engine rotational speed. Moreover, the M/G-ECU 30 controls the motor generator 30 to generate the assist driving torque t_asi at a constant high torque level, thereby resulting in maintaining the output torque t_out at a constant value.

After the shift operation in the transmission 20 at the time t3, the clutch engagement operation is initiated at the time t3. From the time t3 to the time t4, i.e., while the clutch engagement operation has been performed, the clutch 21 is controlled to be partially engaged for the purpose of restraining a sudden variation of the output torque t_out in the same manner as the event of the clutch disengagement operation. By virtue of the partial clutch engagement, the assist driving torque t_asi generated by the motor generator 30 is gradually decreased in the manner of a linear function, wherein the toque t_m of the motor generator 30 becomes virtually zero. When the engine rotational speed n_eg becomes substantially the same as the transmission input shaft rotational speed n_in, the clutch 21 is brought to a full engagement from the partial engagement by the clutch actuator 22. Therefore, the gear ratio changing operation is completed while avoiding shift shock.

However, in the conventional gear ratio changing operation described above, which reduces shift shock by use of a partial clutch engagement, on occasions vehicle deceleration as a result of the partial clutch engagement may expand a period of time required for completing the gear ratio changing operation. This phenomenon is against a driver's desire for vehicle acceleration. Moreover, it is preferable that this phenomenon is to be reconsidered especially when a driver requires sudden vehicle acceleration, sporty driving, or the like.

In light of the foregoing, according to the embodiment of the present invention, a sudden variation of an output torque can be effectively restrained not by use of a partial clutch engagement but by use of an assist driving torque generated by the motor generator 30 actively. Therefore, a sporty gear ratio changing operation can be effectively achieved.

Secondarily, a gear ratio changing operation according to the embodiment of the present invention is described as follow. FIG. 5A is a time chart for explaining a gear ratio changing operation from a first shift stage to a second shift stage. Each line from the top in the time chart in FIG. 5A represents an engine rotational speed N_eg, a transmission input shaft rotational speed N_in, an output torque T_out from the differential gear 20b to the axle 3, an M/G torque T_m generated by the motor generator 30 in response to the signals from the M/G-ECU 35 and a clutch stroke ST_cl corresponding to a stroke of the clutch actuator 22.

From a time T1 to a time T2, the clutch disengagement operation is performed. From the time T2 to a time T3, i.e., while the clutch 21 has been at a condition of a full disengagement, a shift operation is performed in the transmission 20. From the time T3 to a time T4, the clutch engagement operation is performed. At the time T4, the gear ratio changing operation is completed. The gear ratio changing operation from the time T2 to the time T3 in FIG. 5A corresponds to that from the time t2 to the time t3 in FIG. 5B. For the purpose of a clear comparison, the time T2 in FIG. 5A matches the time t3 in FIG. 5B.

The following explains controls of the clutch stroke ST_cl and the motor generator 30 during a clutch disengagement operation in the apparatus according to the embodiment of the present invention.

The M/G-ECU 35 calculates, in response to signals from the AMT-ECU 35, a maximum target assist driving torque (i.e., target assist driving torque) to be generated by the motor generator 30, on the basis of factors such as a depressing amount of the accelerator pedal, a vehicle speed and a shift stage currently selected in the transmission 20. At the time T1, the M/G-ECU 35 which is assist driving torque controlling means controls the motor generator 30 to generate the torque T_m, which should reach the target assist driving torque in a single step and directly. As a specific method of controlling the motor generator 30, it is preferable that a waveform of an electric current supplied to each coil of the motor generator 30 is converted temporarily from a sine wave to a rectangular wave, thereby enabling enhanced torque efficiency. At the same time, the ATM-ECU 25 calculates an assist torque T_asi, which the motor generator 30 is required to generate, and the M/G-ECU 35 controls the motor generator 30 to generate the assist torque T_asi. The clutch actuator 22 disengages the clutch 21 as quickly as possible so as to keep a variation of the output torque T_out within a predetermined range.

As described above, according to the embodiment of the present invention, a period of time required for disengaging the clutch 21 can be effectively shortened while shift shock is effectively decreased and the output torque T_out remains at an appropriate value.

In detail, when the driving power transmitted from the engine to the transmission is reduced suddenly in response to clutch disengagement, the motor generates an assist driving torque like a step function on an output shaft of the transmission. Therefore, a partial clutch engagement, for the purpose of reducing a shift shock at the clutch disengagement, is not required, whereupon a rapid and sporty shift operation and shift feeling can be secured.

The gear ratio changing operation from the time T2 to the time T3 is the same as that from the time t2 to the time t3 in FIG. 5B, and so the explanation thereof will be omitted herein for simplifying the description.

From the time T3 to the time T4, the clutch engagement operation is performed by the AMT-ECU 25. In this case, the clutch 21 is brought to an engagement side through a partial clutch engagement. However, this clutch engagement operation from the time T3 to the time T4 can be performed for a period of time shorter than that by a conventional method. Therefore, the torque T_m generated by the motor generator 30 according to the embodiment of the present invention does not correspond to that by the conventional method.

More particularly, when the clutch engagement is performed faster than that by a conventional method, the engine 10, which has been activated with no load, is applied with load, and the engine rotational speed is reduced. In this case, the driving torque from the engine 10 is decreased in response to the reduction of the engine rotational speed. As a result, regardless of the output torque being generated by the motor generator 30 the output torque T_out declines in response to an excessive reduction of the engine driving torque, wherein an excessive shift shock may occur on occasions.

In light of the foregoing, according to the embodiment of the present invention, the motor generator 30 is controlled to generate additionally a compensating torque T_com for compensating for the reduction of the engine driving torque. The compensating torque T_com is denoted with a triangle-shaped shaded area in FIG. 5A.

Figure 6:
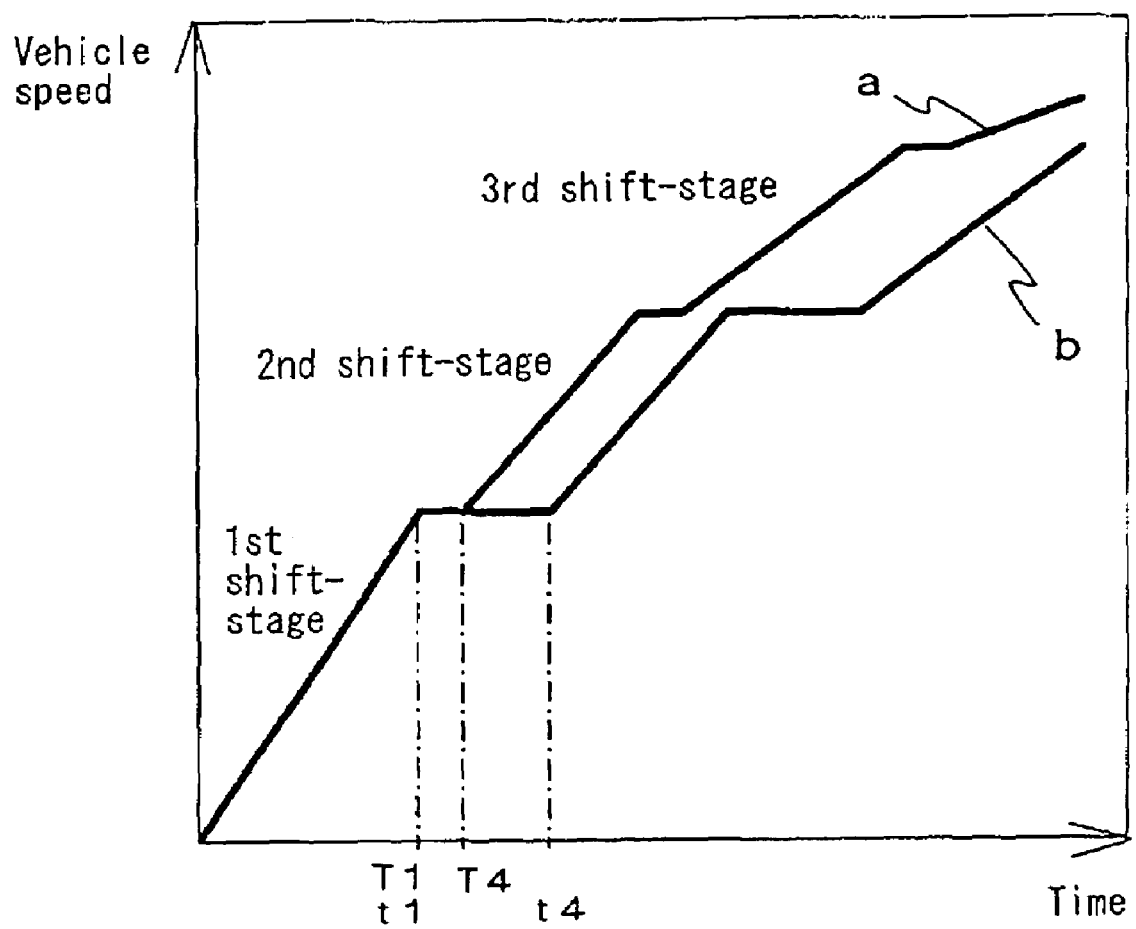
FIG. 6 is a diagram for explaining a relationship between a time for accelerating a vehicle and a vehicle speed while an accelerator pedal is depressed at a constant depressing amount from a condition that the vehicle speed is zero.

As illustrated in FIG. 6, every time the vehicle speed exceeds a predetermined value, the shift operation is performed to select a higher shift stage in the transmission 20. A line a represents a relationship between the vehicle speed and the time for accelerating the vehicle 1 by the apparatus according to the embodiment of the present invention, while a line b represents a relationship between the vehicle speed and the time for accelerating the vehicle 1 by a conventional apparatus. Each horizontal portion in FIG. 6 represents a time where a shift operation is performed in the transmission 20. The longer the horizontal portion is, the longer the period for shifting is.

According to the embodiment of the present invention, in comparison with a conventional method of restraining a degree of shift shock by use of a partial clutch engagement, each period of time required for disengaging and engaging the clutch 21 can be effectively shortened. For example, in the conventional method illustrated in FIG. 5B, a total period of time including the period of time required for disengaging the clutch 21, i.e., the period between the time t1 and the time t2, and the period of time required for engaging the clutch 21, i.e., the period between the time t3 and the time t4, corresponds to approximately 300 msec. In the apparatus according to the embodiment of the present invention illustrated in FIG. 5A, it is possible that each period of time for disengaging and engaging the clutch 21 is shortened to a half thereof. Moreover, in the conventional method illustrated in FIG. 5B, the period of time required for the gear ratio changing operation corresponds to approximately 900 msec. In the apparatus according to the embodiment of the present invention illustrated in FIG. 5A, the period of time required for the gear ratio changing operation corresponds to approximately 600 msec. Therefore, a moderate and sporty gear ratio changing operation can be effectively achieved.

Further, according to the embodiment of the present invention, as an auxiliary driving power source, the motor generator 30, which can generate a driving torque and can generate electricity, is applied when the driving torque transmission is cutoff from the engine 10 to the transmission 20. Alternatively, a motor, which can only generate a driving torque, can be applied as the auxiliary driving power source.

Still further, according to the embodiment of the present invention, the motor generator 30 is separated from the M/G-ECU 35. However, the M/G-ECU 35 can be provided integrally with the motor generator 30.

The principles, the preferred embodiments and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An apparatus for controlling a gear ratio changing operation in a transmission comprising:
an internal combustion engine;
a multi-stage synchromesh-type transmission capable of shifting in accordance with a vehicle driving condition;
a clutch positioned between the internal combustion engine and the transmission and capable of transmitting and interrupting a driving torque between the internal combustion engine and the transmission;
clutch controlling means for controlling the clutch;
a motor positioned at an output shaft of the transmission and configured to generate an assist driving torque;
target assist driving torque calculating means for calculating a target assist driving torque generated by the motor; and assist driving torque controlling means for controlling, in response to transmission and interruption by the clutch of the driving torque between the internal combustion engine and the transmission, the motor to generate the target assist driving torque, wherein, while transmission of the driving torque between the internal combustion engine and the transmission is being cut off during a clutch control at a constant stroke speed from an engaged state to a disengaged state for a shift operation in the transmission, the assist driving torque controlling means controls the motor to generate an assist driving torque so that the assist driving torque reaches the target assist driving torque at a constant rise rate per time.

2. An apparatus for controlling a gear ratio changing operation in a transmission according to claim 1, wherein the assist driving torque controlling means controls the motor to generate the assist driving torque added with a compensating driving torque during the clutch engagement operation.

3. An apparatus for controlling a gear ratio changing operation in a transmission according to claim 2, wherein the compensating driving torque is determined on the basis of a decrease of a driving torque generated by the internal combustion engine, the decrease of the driving torque generated by the internal combustion engine occurs at a time when the clutch is operated to be engaged.

4. An apparatus for controlling a gear ratio changing operation in a transmission according to claim 1, wherein the assist driving torque controlling means converts a waveform of an electric current supplied to the motor from a sine wave to a rectangular wave.

5. An apparatus for controlling a gear ratio changing operation in a transmission according to claim 1, wherein the motor includes a motor generator, and an output shaft of the motor generator is gear-meshed with a ring gear of a differential gear, the ring gear is gear-meshed with the output shaft of the transmission.

6. An apparatus for controlling a gear ratio changing operation in a transmission according to claim 1, wherein the shift operation in the transmission is automatically performed by a shift actuator.

7. An apparatus for controlling a gear ratio changing operation in a transmission according to claim 1, wherein the assist driving torque controlling means starts a vehicle by use of the motor only when the vehicle starts.

* * * * *